Nov. 18, 1930.  L. V. STOELTZLEN  1,781,936
DIESTOCK
Filed April 14, 1928

Leo V. Stoeltzlen
INVENTOR.
BY
ATTORNEYS.

Patented Nov. 18, 1930

1,781,936

UNITED STATES PATENT OFFICE

LEO V. STOELTZLEN, OF ERIE, PENNSYLVANIA, ASSIGNOR TO REED MANUFACTURING COMPANY, OF ERIE, PENNSYLVANIA, A CORPORATION OF PENNSYLVANIA

DIESTOCK

Application filed April 14, 1928. Serial No. 270,101.

The invention is designed to improve die stocks operating with a ratchet drive. With these it is desirable to have the ratchet, or driving ring readily removable from the carrier in order that carriers of different capacities may be readily attached to the same driving mechanism. Features and details of the invention will appear from the specification and claims.

A preferred embodiment of the invention is illustrated in the accompanying drawings as follows:—

Figure 1:
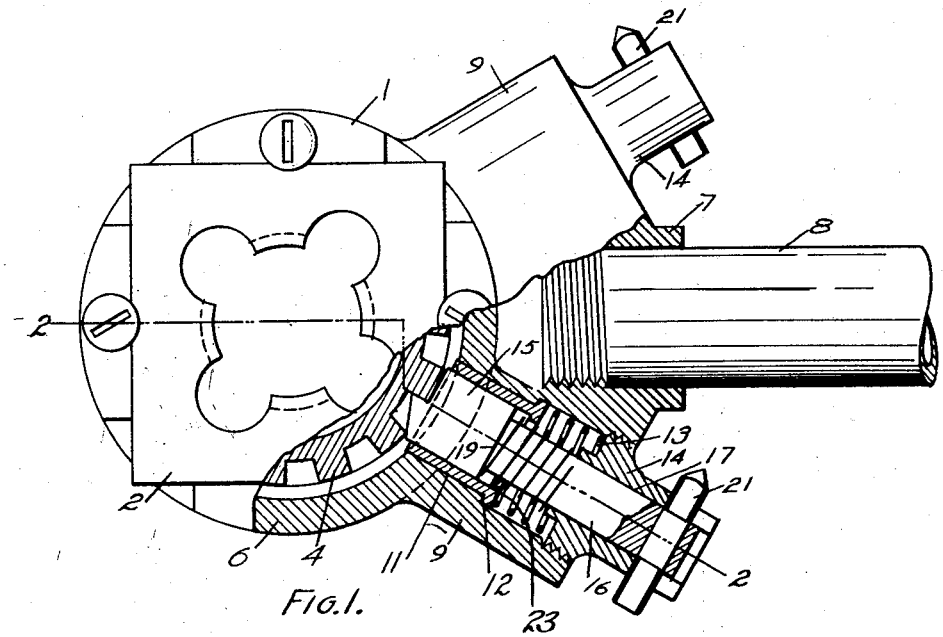

Fig. 1 shows an elevation of a stock, partly in section.

Figure 2:
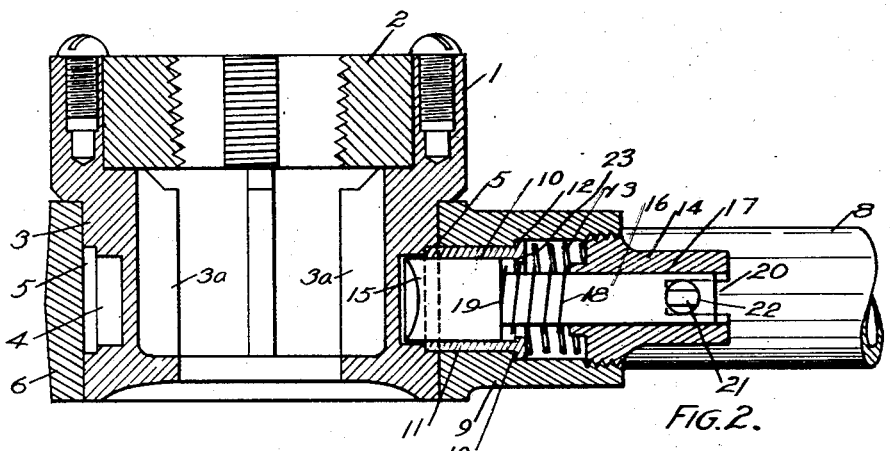

Fig. 2 a section on the line 2—2 in Fig. 1.

Figure 3:
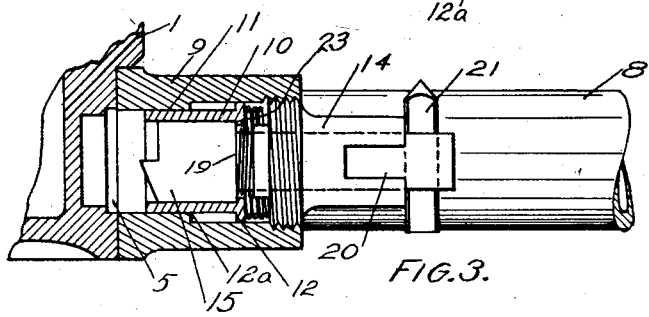

Fig. 3 a detached view of the ratchet pawl mechanism, on the same section as Fig. 2.

1 marks the carrier. In this are arranged dies, or chasers 2. The carrier has a shank 3 with guide ribs 3ª. The shank is provided with ratchet teeth 4, preferably double-faced for reversible operation, and is provided with a locking groove 5, the ratchet teeth being preferably arranged in the bottom of the groove 5. A ratchet ring or handle ring 6 is journaled on the shank. It has a handle socket 7 in which a handle 8 is secured.

The ring also has the pawl socket projections 9. The pawl sockets are alike and provided with similar pawl mechanism. They preferably lock the teeth, however, in sequence, one pawl being in engagement as the other pawl is out of engagement, thus reducing the slack in the driving action in bringing a pawl into engagement. A locking pawl 10 is arranged in an opening 11 of the pawl socket. It is provided with a shoulder 12 at its outer end engaging a shoulder 12ª in the socket and is yieldingly forced forward by a spring 13, the spring 13 being arranged between the end of the pawl 10 and a socket plug 14 screwed into the end of the socket.

A driving pawl 15 is slidingly mounted in the pawl 10, the pawl 10 being in the form of a sleeve. The driving pawl 15 has a shank 16 extending through an opening 17 in the plug 14. A spring 18 operates against a shoulder 19 formed between the shank 16 and the pawl 15 and the end of the plug 14 yieldingly crowds the pawl 15 inwardly. A notch 20 extends across the end of the plug 14. A pin 21 extends through an opening 22 in the end of the shank 16 and through the slot 20. The pin when at the bottom of the slot 20 forms a stop limiting the inward movement of the pawl and the walls of the socket acting on the pin lock the pawl against turning. The movement of the pawl is sufficient to permit the withdrawal of the pin 21 from the slot 20, as shown in Fig. 3, so that the pin may be given a half turn to reverse the pawl.

The pawl 10 has an internal shoulder 23 at its outer end which is adapted to engage the shoulder 19 of the pawl 15 so that with a withdrawal of the pawl 15 the shoulder 19 operating on the shoulder 23 picks up the pawl 10 and with a continued retracting movement of the pawl 15 withdraws the pawl 10, from the groove 5 and thus unlocks the ring from the shank. The pawl 10 may be locked in its outer position by turning the pin 21 a quarter turn and allowing it to rest on the end of the plug 14.

This locking pawl positively locks the ring and shank together yet may be conveniently retracted permitting the disengagement of the ring and shank and as formed it utilizes the same socket extension as the pawl 15.

In operation the pawls are retracted and locked in retracted position, the ring placed on the shank, and the pin 21 turned as indicated by the pointed end in the direction it is desired to drive the carrier. The pawls are released by turning the pin into the slot 20, the locking pawls 10 entering the groove 5 and the driving pawls acting on the ratchet. The carrier then may be operated by merely oscillating the handle 8. By withdrawing the pawls 15 they may be reversed and locked in the reversed position by swinging the pin over the end of the plug 14 and the locking pawl may be withdrawn from locking engagement by a sufficient withdrawal of the pawl 15, the shoulder 19 picking up the pawl 10 and carrying it to its outer, or unlocked position.

What I claim as new is:—

1. In a die stock, the combination of a carrier having a shank, said shank having ratchet teeth thereon and a locking pawl receiving groove; a handle ring on the shank; a locking pawl mounted in the ring and projecting into said pawl receiving groove; and a driving pawl carried by the ring and acting on said ratchet teeth.

2. In a die stock, the combination of a carrier having a shank, said shank having ratchet teeth thereon and a locking pawl receiving groove; a handle ring on the shank; a locking pawl mounted in the ring and projecting into said pawl receiving groove; and a driving pawl carried by the ring and acting on said ratchet teeth, one of said pawls being movably mounted within the other of said pawls.

3. In a die stock, the combination of a carrier having a shank, said shank having ratchet teeth thereon and a locking pawl receiving groove; a handle ring on the shank; a locking pawl mounted in the ring and projecting into said pawl receiving groove; and a driving pawl carried by the ring and acting on said ratchet teeth, the driving pawl being movably mounted in the locking pawl.

4. In a die stock, the combination of a carrier having a shank, said shank having ratchet teeth thereon and a locking pawl receiving groove; a handle ring on the shank having a pawl socket therein; a locking pawl in the form of a sleeve in the socket; a spring operating on the locking pawl; a socket plug forming a base for the spring; and a driving pawl within the locking pawl, the spring acting on the locking pawl.

5. In a die stock, the combination of a carrier having a shank, said shank having ratchet teeth thereon and a locking pawl receiving groove; a handle ring on the shank having a pawl socket therein; a locking pawl in the form of a sleeve in the socket; a spring operating on the locking pawl; a socket plug forming a base for the spring; a driving pawl within the locking pawl, the spring acting on the locking pawl; and means for reversing the driving pawl.

6. In a die stock, the combination of a carrier having a shank, said shank having ratchet teeth thereon and a locking pawl receiving groove; a handle ring on the shank having a pawl socket therein; a locking pawl in the form of a sleeve in the socket; a spring operating on the locking pawl; a socket plug forming a base for the spring; a driving pawl within the locking pawl, the spring acting on the locking pawl; and interlocking means between the locking pawl and driving pawl retracting the locking pawl with a retracting movement of the driving pawl beyond its range of movement for ratchet action.

7. In a die stock, the combination of a carrier having a shank, said shank having ratchet teeth thereon and a locking pawl receiving groove; a handle ring on the shank having a pawl socket therein; a locking pawl in the form of a sleeve in the socket; a spring operating on the locking pawl; a socket plug forming a base for the spring; a driving pawl within the locking pawl, the spring pawl within the locking pawl; interlocking means between the locking pawl and driving pawl retracting the locking pawl with a retracting movement of the driving pawl beyond its range of movement for ratchet action; and means for locking the pawls in retracted position.

8. In a die stock, the combination of a carrier having a shank, said shank having ratchet teeth thereon and a locking pawl receiving groove; a handle ring on the shank having a pawl socket therein; a locking pawl in the form of a sleeve in the socket; a spring operating on the locking pawl; a socket plug forming a base for the spring; a driving pawl within the locking pawl, the spring acting on the locking pawl; interlocking means between the locking pawl and driving pawl retracting the locking pawl with a retracting movement of the driving pawl beyond its range of movement for ratchet action; and means for locking the pawls in retracted position comprising a cross pin acting on the outer end of the socket.

9. In a die stock, the combination of a carrier having a shank, said shank having ratchet teeth thereon and a locking pawl receiving groove; a handle ring on the shank having a pawl socket therein; a locking pawl in the form of a sleeve in the socket; a spring operating on the locking pawl; a socket plug forming a base for the spring; a driving pawl within the locking pawl, the spring acting on the locking pawl; interlocking means between the locking pawl and driving pawl retracting the locking pawl with a retracting movement of the driving pawl beyond its range of movement for ratchet action; and means for locking the pawls in retracted position comprising a cross pin acting on the outer end of the socket, said socket being provided with a locking groove acting on the pin for reversing the ratchet.

10. In a die stock, the combination of a carrier having a shank, said shank having a locking groove therein and ratchet teeth in the bottom of the groove; a handle ring on the shank; a locking pawl mounted in the ring operating in the groove; and a driving pawl operating in the ring and acting on said ratchet teeth.

11. In a die stock, the combination of a carrier having a shank, said shank having ratchet teeth thereon and a locking pawl receiving groove; a handle ring on the shank; a locking pawl mounted in the ring and projecting into said pawl; a driving pawl carried by the ring and acting on said ratchet teeth, one of said pawls being movably mounted within the other of said pawls; and means for reversing the driving pawl.

12. In a die stock, the combination of a carrier having a shank, said shank having ratchet teeth thereon and a locking pawl receiving groove; a handle ring on the shank; a locking pawl mounted in the ring and projecting into said pawl; a driving pawl carried by the ring and acting on said ratchet teeth, the driving pawl being movably mounted in the locking pawl; and means for reversing the driving pawl.

In testimony whereof I have hereunto set my hand.

LEO V. STOELTZLEN.